(12) United States Patent
Nishimoto

(10) Patent No.: US 6,822,165 B2
(45) Date of Patent: Nov. 23, 2004

(54) GROMMET WITH CLOSED AIRSPACE INSIDE THEREOF

(75) Inventor: Chikao Nishimoto, Shizuoka (JP)

(73) Assignee: Yazaki Corporation, Tokyo (JP)

( * ) Notice: Subject to any disclaimer, the term of this patent is extended or adjusted under 35 U.S.C. 154(b) by 0 days.

(21) Appl. No.: 10/478,103

(22) PCT Filed: May 29, 2002

(86) PCT No.: PCT/JP02/05187
§ 371 (c)(1),
(2), (4) Date: Nov. 29, 2003

(87) PCT Pub. No.: WO02/097939
PCT Pub. Date: Dec. 5, 2002

(65) Prior Publication Data
US 2004/0140118 A1 Jul. 22, 2004

(30) Foreign Application Priority Data
May 29, 2001 (JP) ........................ 2001-160768

(51) Int. Cl.[7] ............................................. H02G 3/18
(52) U.S. Cl. ............... 174/65 G; 174/135; 174/152 G; 174/153 G; 174/65 R; 16/2.1
(58) Field of Search ...................... 174/65 G, 65 R, 174/65 SS, 151, 152 G, 153 G, 135, 100; 16/2.1, 2.2; 248/56

(56) References Cited
U.S. PATENT DOCUMENTS 5,360,945 A * 11/1994 Truesdale et al. ........... 174/151
6,088,874 A * 7/2000 Nakata et al. ................. 16/2.1
6,372,995 B1 * 4/2002 Mochizuki et al. ........ 174/65 G
6,489,559 B2 * 12/2002 Nakata et al. ............ 174/65 G
6,495,767 B2 * 12/2002 Okuhara et al. ......... 174/152 G
2002/0056563 A1 5/2002 Katayama et al. ........... 174/65

FOREIGN PATENT DOCUMENTS

| EP | 0 990 564 A2 | 4/2000 |
| JP | 09-289723 | 4/1997 |
| JP | 09-289726 | 11/1997 |
| JP | 10-047548 | 2/1998 |
| JP | 11-150837 | 6/1999 |
| JP | 2000-104865 | 4/2000 |
| JP | 2001-041358 | 2/2001 |

* cited by examiner

Primary Examiner—Dhiru R Patel
(74) Attorney, Agent, or Firm—Finnegan, Henderson, Farabow, Garrett & Dunner, L.L.P.

(57) ABSTRACT

A grommet (1) including a first tubular potion (33) holding an electric wire (10) therein; an elastic first flange (34) formed on a front part of the first tubular portion (33); a second tubular portion (31) which extends rearward from the first flange (34) and is to be fitted in a panel hole (21) when the first tubular portion (33) is pulled frontward; a rib portion (39) annularly formed on the second tubular portion (31); and an elastic second flange (35) formed on a rear part of the first tubular portion (33), which diverges rearward. Cooperating with the first tubular portion (33) and the first flange (34), the second tubular portion (31) defines an annular space (37), and an entrance thereof is defined by the rib portion (39). The second flange (35) extends in a radial direction outside the entrance of the annular space (37).

6 Claims, 3 Drawing Sheets

GROMMET WITH CLOSED AIRSPACE INSIDE THEREOF

TECHNICAL FIELD

The present invention relates to a grommet with a closed airspace inside thereof providing enhanced sound insulation.

BACKGROUND ART

Japanese Unexamined Patent Publication No. 9(1997)—289723 discloses a grommet including an outer tubular portion, an inner tubular portion, a shield wall interconnecting the outer and inner tubular portions, a sound insulation wall on the inner tubular portion and an engaging member on the outer tubular portion.

In this grommet, the engaging member and the sound insulation wall must be rigid to a certain degree, since the sound insulation wall needs to maintain engagement with the engaging member remaining inside the outer tubular portion even when the inner tubular portion is inclined with respect to the outer tubular portion. Therefore, a large force is necessary to get the sound insulation wall to go over the engaging member and to enter into the outer tubular portion, making the insertion of the sound insulation wall into the outer tubular portion very hard.

The engaging member or the sound insulation wall can be of reduced rigidity in order to facilitate insertion, however, the sound insulation wall easily disengages from the engaging member in this case, the hermetical seal of an airspace closed by the engagement is lost, and a sound insulation can not be maintained.

DISCLOSURE OF INVENTION

The object of the present invention is to provide a grommet with a sound insulation wall insertable into an outer tubular portion with small insertion force, in which the inserted sound insulation wall is not easily releasable, thereby maintaining reliable sound insulation.

A first aspect of the present invention is a grommet comprising: a first tubular portion holding an electric wire therein; an elastic first flange formed on a front part of the first tubular portion; a second tubular portion extending rearward from the first flange, the second tubular portion to be fitted in a panel hole as the first tubular portion is pulled frontward, the second tubular portion cooperating with the first tubular portion and the first flange to define an annular space; a rib portion annularly formed on the second tubular portion, defining an entrance to the annular space; and an elastic second flange formed on a rear part of the first tubular portion, diverging rearward to extend in a radial direction outside the entrance of the annular space, wherein, as the first tubular portion is pulled frontward to fit the second tubular portion in the panel hole, the first flange elastically deforms to allow the first tubular portion to move frontward relative to the second tubular portion, the second flange deforms and goes over the rib portion to enter the annular space, and, as the first tubular portion is released, the second flange, in an inverted shape diverging frontward, engages with the rib portion and closes the annular space.

Preferably, the rib portion is divided into a plurality of ribs by a cut in a radial direction of the second tubular portion.

According to the first aspect of the present invention constituted as described above, by pulling the electric wire held by the first tubular portion frontward, the second tubular portion extending rearward from the first flange is fitted in the panel hole. Here, the first flange elastically deforms in an axial direction in a manner whereby an inner periphery thereof is pulled by the first tubular portion, to allow the first tubular portion to move frontward relative to the second tubular portion. The second flange formed on the rear part of the first tubular portion elastically deforms and goes over the annular rib portion formed on the second tubular portion, and enters the annular space inside the second tubular portion.

Since the second flange is diverging rearward, the second flange can easily enter the annular space inside the second tubular portion with little force, even though the second flange extends in a radial direction outside the entrance of the annular space. In addition, if the annular rib portion to engage with the second flange is divided into a plurality of ribs, it can be further flexible. Owing to the flexure of the both members, the second flange can easily get over the rib portion and enter the annular space inside the second tubular portion with little force.

After the second flange enters the annular space and the second tubular portion is fitted into the panel hole, when the electric wire is released, the first tubular portion is restituted to an initial position owing to the resilience of the first wall. An outer periphery of the second flange engages with the rib portion on the second tubular portion, the second flange is inverted pivoting on the outer periphery thereof to be in the inverted shape diverging frontward, and the annular space is closed. In this state, the outer periphery of the second flange firmly contacts with the rib portion with resilience of the second flange to recover its initial shape, whereby hermetic sealing is maintained. Moreover, the closed annular space functions as a sound barrier of airspace between the inside and the outside of the panel, thus enhancing the sound insulation of the grommet.

Since the second flange is diverging rearward, once the outer periphery of the second flange gets over the rib portion and engages therewith, the outer periphery of the second flange tends to deform in a manner that a biting margin (an engaging margin) of the second flange overlapping the rib portion becomes larger when the first tubular portion is displaced rearward relative to the second tubular portion. Moreover, since both the second flange and the rib portion are made flexible, the engagement thereby is not released. Hence, the airspace is reliably maintained, whereby high sound insulation can be secured.

Whereas the second flange and the rib portion are flexible, engagement therebetween is not easily releasable. Even when lateral force is applied to the electric wire and the first tubular portion is inclined relative to the second tubular portion, the state of engagement between the rib portion and the second flange and the hermetic sealing of the closed annular space is maintained. Such an aspect is attributable to a synergy of a conical shape of the second flange and flexibilities of both of the second flange and the rib portion.

A second aspect of the present invention is the grommet according to the first aspect, in which the first flange is in a conical shape, as an initial shape thereof, diverging frontward.

Preferably, the first flange can be in an inverted shape diverging rearward, allowing the first tubular portion to move frontward relative to the second tubular portion.

Further preferably, the second flange can be in the inverted shape diverging frontward and engage with the rib portion owing to resilience of the first flange in the inverted shape diverging rearward to recover the initial shape.

According to the second aspect of the present invention constituted as described above, since the first flange has the initial shape of the conical shape diverging frontward, resilience thereof in the inverted shape diverging rearward to recover the initial shape generates a force strong enough to move the first tubular portion to an original position relative to the second tubular portion and to invert the second flange into the inverted shape diverging frontward. Accordingly, the attachment of the grommet to the panel is completed simply by pulling and releasing the electric wire.

BRIEF DESCRIPTION OF DRAWINGS

The invention will now be described with reference to the accompanying drawings wherein.

BEST MODE FOR CARRYING OUT THE INVENTION

Figure 1A:
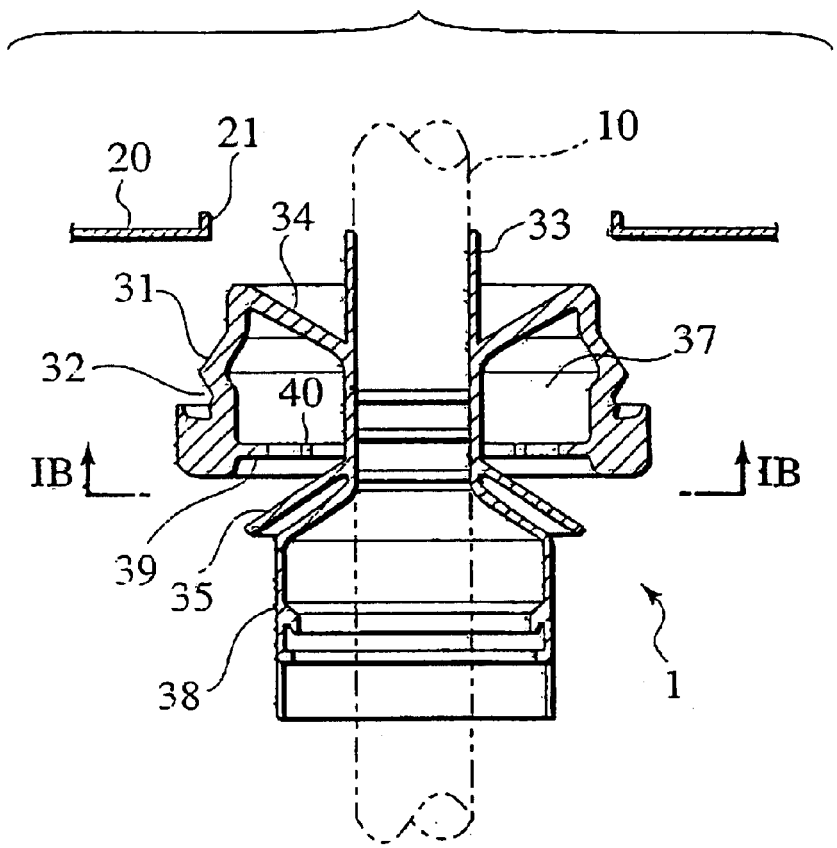
FIG. 1A is a cross-sectional view showing a constitution of a grommet according to an embodiment of the present invention.

An embodiment of the present invention will be explained below with reference to the drawings, wherein like members are designated by like reference characters.

In the following, a leading side of a grommet upon attachment of the grommet to a panel hole (upper sides in FIG 1A, FIG. 2A, FIG. 3 and FIG. 4) will be referred to as the front of the grommet, and the opposite side thereto (lower sides in FIG. 1A, FIG. 2A, FIG. 3 and FIG. 4) will be referred to as the rear of the grommet.

As shown in FIG. 1A, a grommet 1 includes: an inner tubular portion 33 (as a first tubular portion) of a predetermined length which holds an electric wife (a wire harness) 10 for penetrating a circular through panel hole 21 to pass therethrough; an outer tubular portion 31 (as a second tubular portion) of a predetermined length disposed coaxially outside the inner tubular portion 33 which is provided on an outer peripheral face thereof with a fitting groove 32 to be fitted to an inner periphery of the panel hole 21 of a panel 20; an elastic shield wall 34 (as a first flange) including an inner periphery joined to an intermediate portion in the axial direction of the inner tubular potion 33 and an outer periphery joined to an edge on an front side in the axial direction of the outer tubular portion 31 extending rearward therefrom, the shield wall 34 closing a front side of an annular space 37 defined between the outer tubular portion 31 and the inner tubular portion 33 and allowing displacement of the inner tubular portion 33 in the axial direction with respect to the outer tubular portion 31 owing to the elastic deformation of the shield wall 34; an elastic sound insulation wall 35 (as a second flange) which is disposed on a rear side in the axial direction of the inner tubular portion 33 than the shield wall 34, the sound insulation wall 35 including a flexible outer periphery extending as a free end and an inner periphery joined to an outer peripheral ace of the inner tubular portion 33 and being formed into a cone wall shape diverging rearward with a diametrical increase toward a rear side thereof; and engaging member 39 (as a rib portion) which is formed annularly on an inner peripheral face of a rear side of the outer tubular portion 31, defining an entrance to the annular space 37, the engaging member 39 protruding more inwardly from the outer tubular portion 31 than the outer periphery of the sound insulation wall 35, i.e. the sound insulation wall 35 extends in a radial direction outside the entrance of the annular space 37.

Figure 2A:
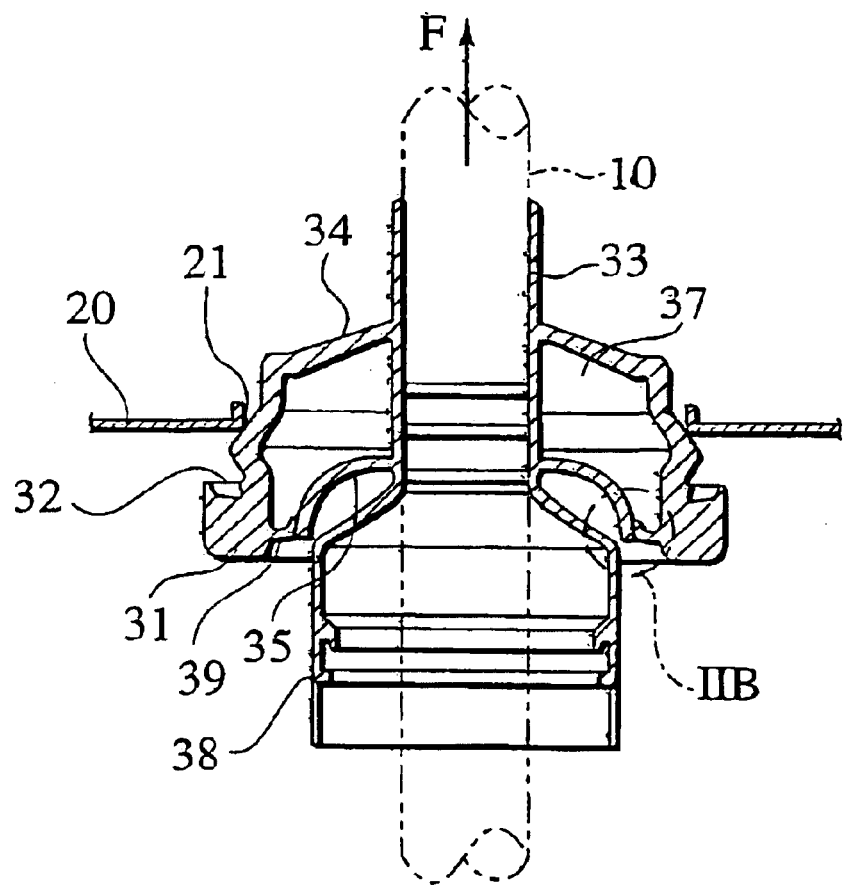
FIG. 2A is a cross-sectional view showing a state in process of fitting the grommet according to the embodiment of the present invention into a panel hole.

As shown in FIG. 2A, when the inner tubular portion 33 is pulled frontward to fit the outer tubular portion 31 in the panel hole 21, the shield wall 34 elastically deforms to allow the inner tubular portion 33 to move toward the front side in the axial direction with respect to the outer tubular portion 31, the sound insulation wall 35 deforms and the outer periphery 35a thereof extending as the free end goes over the annular engaging member 39 formed on the inner peripheral face of the outer tubular portion 31, and enters the annular space 37 (an inside of the outer tubular portion 31) and more inward and frontward than the engaging member 39. Thereafter, when the inner tubular portion 33 is released and restituted to the original position with respect to the outer tubular portion 31, as shown in FIG. 3A, the outer periphery 35a of the sound insulation wall 35 is engaged with the engaging member 39 provided in the inner periphery of the outer tubular portion 31, whereby the sound insulation wall 35 is inverted into an inverted cone wall shape diverging frontward reverse to an initial shape (that is, a cone wall shape with a diametrical increase toward the front side) while pivoting the outer periphery 35a (or an inner periphery) thereof. In this event, the sound insulation wall 35, the shield wall 34, the outer tubular portion 31 and the inner tubular portion 33 collectively define the closed annular space 37.

Figure 1B:
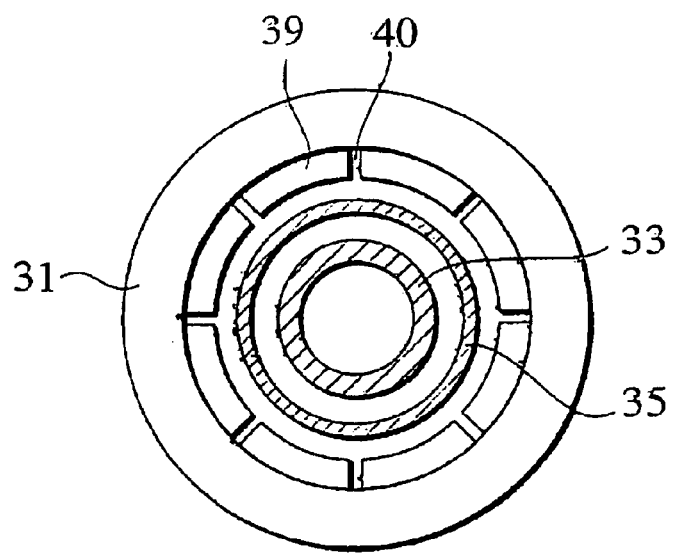
FIG. 1B is a cross-sectional view showing the constitution of the grommet according to the embodiment of the present invention, taken along the line IB—IB in FIG. 1A.

The sound insulation wall 35 is formed thinly and lithely so as to be flexible. Moreover, as shown in FIG. 1B, the engaging member 39 disposed on the inner peripheral face of the outer tubular portion 31 includes cuts or slits 40 provided in radial directions in several positions along the circumferential direction thereof In other words, the engaging member 39 is divided into pluralities along the circumferential direction at given intervals, allowing the engaging member 39 to be lithely flexible.

The shield wall 34 is formed, as an initial shape, in a cone wall shape diverging frontward with a diametrical increase toward the front side. The aspect of the cone wall shape is inverted (that is, deformed into an inverted cone wall shape diverging rearward with a diametrical increase toward the rear side) while pivoting an inner periphery (or an outer periphery) thereof, thus allowing the inner tubular portion 33 to move frontward with respect to the outer tubular portion 31. Resilience of the shield wall 34 in the inverted cone wall shape diverging rearward to recover the initial shape reinstates the displacement of the inner tubular portion 33 with respect to the outer tubular portion 31, thereby inverting the sound insulation wall 35.

Moreover, on the rear side of the inner tubular portion 33, provided is a filling cup 38 as a mold with a larger diameter than the inner tubular portion 33 for filling water sealant to fill in a gap around the electric wire 10 passing through the inner tubular portion 33.

Now, operations of the grommet of the embodiment will be described.

As shown in FIG 1A, the electric wire 10 is put through the inner tubular portion 33 on using the grommet 1, and then, putting the rear side of the grommet 1 upward, the melted water sealant (not shown) is filled in the filing cup 38, whereby the water sealant is spread over the gap around the electric wire 10. Thereby, the gap around the electric wire 10 is filled in with the hardened water sealant.

The front side of the electric wire 10 with the grommet attached thereto as described above is passed through the panel hole 21 on the panel 20. Subsequently, the electric wire 10 is pulled by force F (as illustrated by an arrow in FIG 2A) toward the front side, whereby the front side of the inner tubular portion 33 is passed through the panel hole 21, and the outer tubular portion 31 joined to the shield wall 34, contacts with the inner periphery of the panel hole 21.

When the electric wire 10 is pulled further, as shown in FIG. 2A, the inner periphery of the shield wall 34 is pulled by the inner tubular portion 33 and deforms in the axial direction, that is, the aspect of the cone wall shape is inverted to an inverted shape (that is, deformed into the cone wall shape diverging rearward with the diametrical increase toward the rear side) while pivoting the inner periphery (or the outer periphery). Thereafter, the fitting groove 32 of the outer tubular portion 31 is pulled by the shield wall 34 and fitted to the inner periphery of the panel hole 21. In this event, the inner tubular portion 33 is disposed toward the front side with respect to the outer tubular portion 31 owing to the deformation of the shield wall 34. Therefore, the outer periphery 35a of the sound insulation wall 35 formed on the outer peripheral face on the rear side of the inner tubular portion 33 goes over the engaging member 39 on the inner peripheral face of the outer tubular portion 31 and the sound insulation wall 35, enters the inside of the outer tubular portion 31.

Figure 2B:
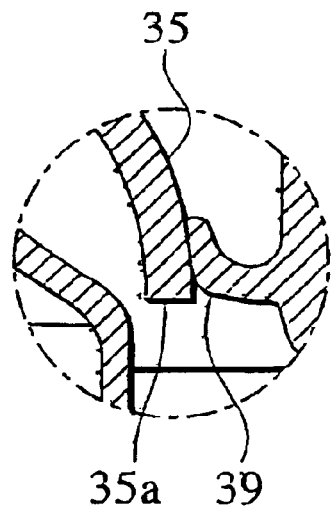
FIG. 2B is an enlarged view of the IIB portion illustrated in FIG. 2A, showing a state in the process of fitting the grommet according to the embodiment of the present invention into the panel hole.

In this event, the sound insulation wall 35 is formed into the cone wall shape tapered toward the front side of the outer tubular portion 31 (that is, in a forward direction with respect to the direction of insertion into the outer tubular portion 31). Accordingly, such an aspect receives little resistance when the sound insulation wall 35 is inserted into the outer tubular portion 31 (in other words, the outer periphery 35a of the sound insulation wall 35 is not caught or blocked by the engaging member 39 on the inner peripheral face of the outer tubular portion 31). In this way, it is possible to insert the sound insulation wall 35 into the outer tubular portion 31 easily with small force Furthermore, since the sound insulation wall 35 and the engaging member 39 on the inner peripheral face of the outer tubular portion 31 are flexible, as shown in FIG. 2B, the sound insulation wall 35 can easily goes over the engaging member 39 and enter the inside of the outer tubular portion 31 with the small force owing to the flexure of both members.

Figure 3:
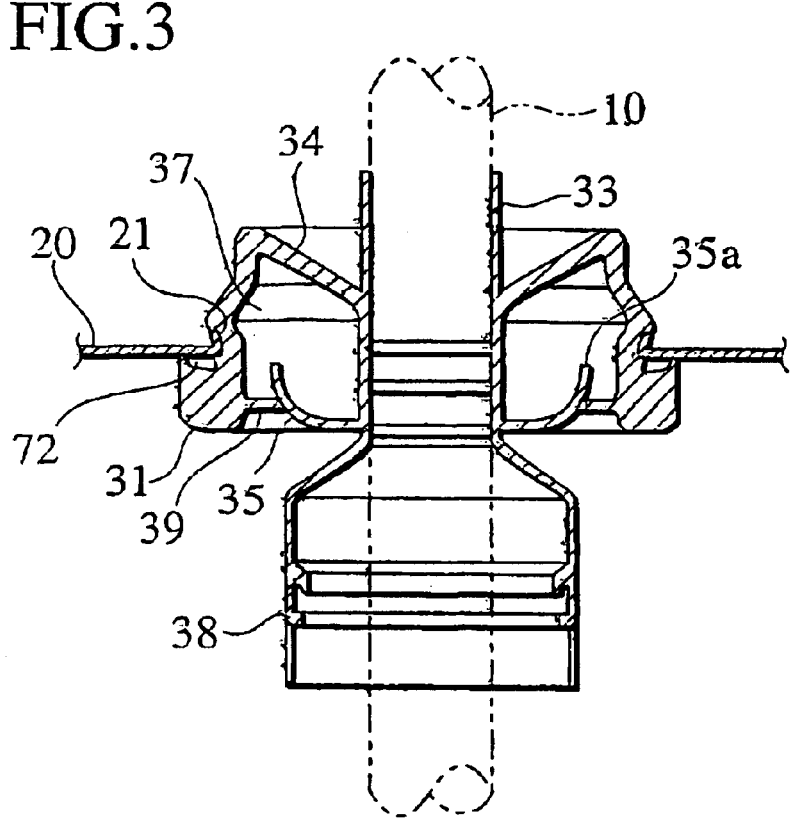
FIG. 3 is a cross-sectional view showing a state in which the grommet according to the embodiment of the present invention is fitted into the panel hole.

When the sound insulation wall 35 enters the inside of the outer tubular portion 31 and the fitting groove 32 of the outer tubular portion 31 is fitted to the inner periphery of the panel hole 21 as described above, then tension of the electric wire 10 is released. Accordingly, as shown in FIG. 3, the inner tubular portion 33 returns to the initial position with respect to the outer tubular portion 31 owing to the resilience of the shield wall 34, whereby the outer periphery 35a of the sound insulation wall 35 is caught by the engaging member 39 on the inner peripheral face of the outer tubular portion 31 in accordance therewith. In this way, the sound insulation wall 35 is inverted while pivoting the outer periphery 35a thereof and formed into the inverted cone wall shape of the reverse aspect to the foregoing initial shape, thereby defining the closed space 37 cooperating with the outer tubular portion 31, the inner tubular portion 33, and the shield wall 34. In this event, the sound insulation wall 35 is tightly pressed to the engaging member 39 with the resilience thereof recovering the initial shape. Accordingly, high hermetic sealing of the closed space 37 is maintained. The closed space 37 functions as an airspace shielded from outside, whereby sound insulation of the grommet 1 is enhanced.

As described above, according to the grommet 1 of the embodiment, the sound insulation wall 35, which enters the inside of the outer tubular portion 31 and thereby defines the closed space 37, has the cone wall shape diverging rearward with the diametrical increase toward the rear side. Accordingly, the sound insulation wall 35 can be easily inserted into the outer tubular portion 31 with small force. Moreover, as shown in FIG. 3, the sound insulation wall 35 is constituted so as to be the inverted cone wall shape of the reverse aspect when the inner tubular portion 33 is restituted while the sound insulation wall 35 is inserted into the outer tubular portion 31. Accordingly, the sound insulation wall 35 in not easily releasable from the outer tubular portion 31 after inversion.

In other words, under the state of usage as shown in FIG. 3, the sound insulation wall 35 needs to be further deformed in order to release the outer periphery 35a of the sound insulation wall 35 out of the engaging member 39 of the outer tubular portion 31. However, once where the sound insulation wall 35 is engaged with the engaging member 39, the engagement is not easily releasable because the sound insulation wall 35 has the initial shape of the cone wall shape diverging rearward with the diametrical increase toward the rear side, and a biting margin (an engaging margin) between the engaging member 39 and the sound insulation wall 35 thereby becomes greater than in the event when the sound insulation wall 35 goes over the engaging member 39 upon attachment. Therefore, it is possible to maintain the airspace reliably, thus securing high sound insulation.

Figure 4:
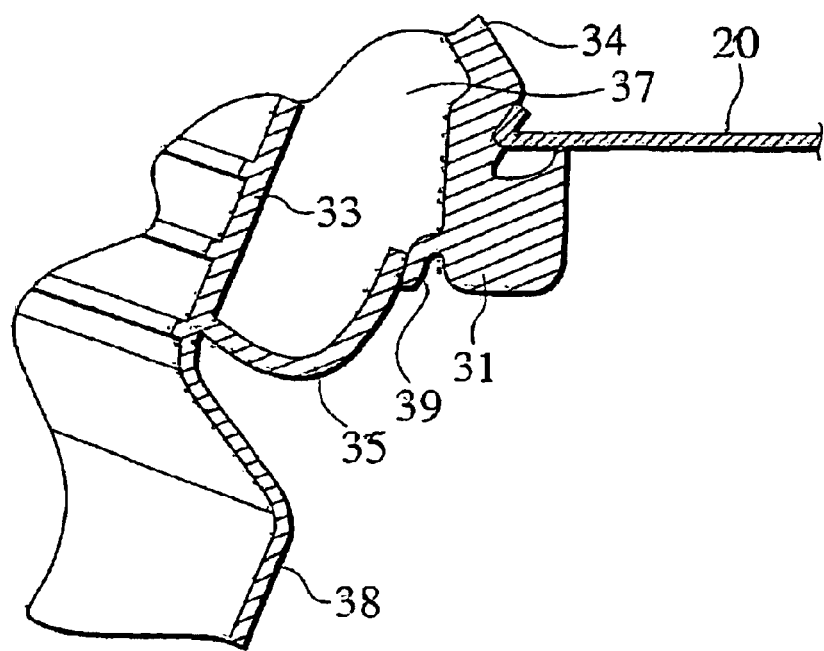
FIG. 4 is a cross-sectional view of a principal part of the grommet according to the embodiment of the present invention; which shows the relation between a sound insulation wall and an engaging member in the case when an inner tubular portion is inclined with respect to an outer tubular portion.

Moreover, as shown in FIG. 4, there is a case depending on the actual conditions of usage where lateral force acts on the electric wire 10 and the inner tubular portion 33 is inclined such that the axis of the inner tubular portion 33 crosses the axial direction of the outer tubular portion 31. Even in that case, the engaging member 39 and the sound insulation wall 35 are mutually flexed, whereby engagement between the both members can be maintained. Therefore, the hermetic sealing of the closed space 37 is maintained without causing problems such as the easy release of the engagement of the sound insulation wall 35.

Moreover, the sound insulation wall 35 is formed integrally on the inner tubular portion 33 and in a cone wall shape opening outward. Accordingly, the provision of the water sealant filling cup 38 on the rear side of the inner tubular portion 33 can be readily achieved by molding. In addition, the sound insulation wall 35 in the inverted cone wall shape of the reverse aspect to the initial shape tightly contacts with the engaging member 39 in the inner periphery of the outer tubular portion 31 owing to the resilience thereof. Accordingly, the hermetic sealing of the closed space 37 is reliably maintained.

Furthermore, regarding this grommet 1, when the shape of the shield wall 34 is formed into the cone wall shape of the reverse aspect to the sound insulation wall 35 and the shield wall 34 inverted as shown in FIG. 2A, the pulling of the electric wire 10 restores the inner tubular portion 33 back to the initial position due to the strong resilience of the shield wall 34 to recover the initial shape as shown in FIG 3. Accordingly, the inner tubular portion 33 is pulled by the strong force to return to the initial position just by releasing the force of pulling the inner tubular portion 33, whereby the sound insulation wall 35 is inverted at speed to define the closed space 37.

In other words, the strong inverse resilience of the shield wall 34 is effectively utilized as the force for inverting the sound insulation wall 35. Accordingly, if the electric wire 10 is pulled to some extent and the force is thereby applied thereto, then the grommet 1 can be automatically attached in an appropriate condition only by releasing the tension of the electric wire 10.

Although the filling cup 38 is provided on the rear portion of the inner tubular portion 33 in the above-described embodiment, the filling cup 38 may be omitted therein.

Also, the sound insulation wall 35 may be formed to have an elastic part limited to the outer periphery thereof.

Although only one embodiment of the invention has been disclosed and described, it is apparent that the other embodiments and modification of the invention are possible.

INDUSTRIAL APPLICABILITY

As described above, according to the present invention, it is possible to easily insert the sound insulation wall into the outer tubular portion using small force of insertion and thereby close the airspace. The sound insulation wall inserted into the outer tubular portion is not easily releasable, and the engaging member and the sound insulation wall closely contact each other owing to the resilience of the sound insulation wall inverted upon completion of attachment of the grommet, whereby sound insulation can be reliably maintained. Therefore, the present invention provides an advantageous grommet.

What is claimed is:

1. A grommet comprising:
a first tubular portion holding an electric wire therein;
an elastic first flange formed on a front part of the first tubular portion;
a second tubular portion extending rearward from the first flange, the second tubular portion to be fitted in a panel hole as the first tubular portion is pulled frontward, the second tubular portion cooperating with the first tubular portion and the fist flange to define an annular space;
a rib portion annularly formed on the second tubular portion, defining an entrance to the annular space; and
an elastic second flange formed on a rear part of the first tubular portion, diverging rearward to extend in a radial direction outside the entrance of the annular space,
wherein, as the first tubular portion is pulled frontward to fit the second tubular portion in the panel hole, the first flange elastically deforms to allow the first tubular portion to move frontward relative to the second tubular portion, the second flange deforms and goes over the rib portion to enter the annular space, and, as the first tubular portion is released, the second flange, in an inverted shape diverging frontward, engages with the rib portion and closes the annular space.

2. The grommet according to claim 1, wherein the first flange is in a conical shape, as an initial shape thereof, diverging frontward.

3. The grommet according to claim 2, wherein the first flange can be in an inverted shape diverging rearward, allowing the first tubular portion to move frontward relative to the second tubular portion.

4. The grommet according to claim 3, wherein the second flange can be in the inverted shape diverging frontward and engage with the rib portion owing to resilience of the first flange in the inverted shape diverging rearward to recover the initial shape.

5. The grommet according to claim 1, wherein the rib portion is divided into a plurality of ribs by cuts in a radial direction of the second tubular portion.

6. The grommet according to claim 1, wherein the first tubular portion is configured with a mold for filling a material between the electric wire and the first tubular portion.

* * * * *

UNITED STATES PATENT AND TRADEMARK OFFICE
CERTIFICATE OF CORRECTION

PATENT NO. : 6,822,165 B2
DATED : November 23, 2004
INVENTOR(S) : Chikao Nishimoto It is certified that error appears in the above-identified patent and that said Letters Patent is hereby corrected as shown below:

Title page,
Item [57], ABSTRACT, delete in its entirety and insert therefore:
-- A grommet may include a first tubular portion holding an electric wire therein, an elastic first flange formed on a front part of the first tubular portion, and a second tubular portion extending rearward from the first flange. The second tubular portion may be fitted in a panel hole as the first tubular portion is pulled frontward. A rib portion may be annularly formed on the second tubular portion, and an elastic second flange may be formed on a rear part of the first tubular portion, which diverges rearward. Cooperating with the first tubular portion and the first flange, the second tubular portion may define an annular space, and an entrance thereof may be defined by the rib portion. The second flange may extend in a radial direction outside the entrance of the annular space. --.

Column 8,
Line 5, "fist" should read -- first --.

Signed and Sealed this

Thirty-first Day of May, 2005

JON W. DUDAS
*Director of the United States Patent and Trademark Office*